TAPE ROLL HANDLING APPARATUS AND ROLL THEREFOR

Filed Nov. 3, 1967 9 Sheets-Sheet 1

INVENTOR.
James W. F. Blackie
Chester W. Newell
BY Charles A. Vogel
Flehr, Hohbach, Test, Albritton & Herbert
Attorneys

TAPE ROLL HANDLING APPARATUS AND ROLL THEREFOR

INVENTOR.
James W. F. Blackie
Chester W. Newell
Charles A. Vogel
BY
Flehr, Hohbach, Test,
Albritton & Herbert
Attorneys

TAPE ROLL HANDLING APPARATUS AND ROLL THEREFOR

INVENTOR.
James W. F. Blackie
Chester W. Newell
Charles A. Vogel
BY
Flehr, Hohbach, Test, Albritton & Herbert
Attorneys TAPE ROLL HANDLING APPARATUS AND ROLL THEREFOR
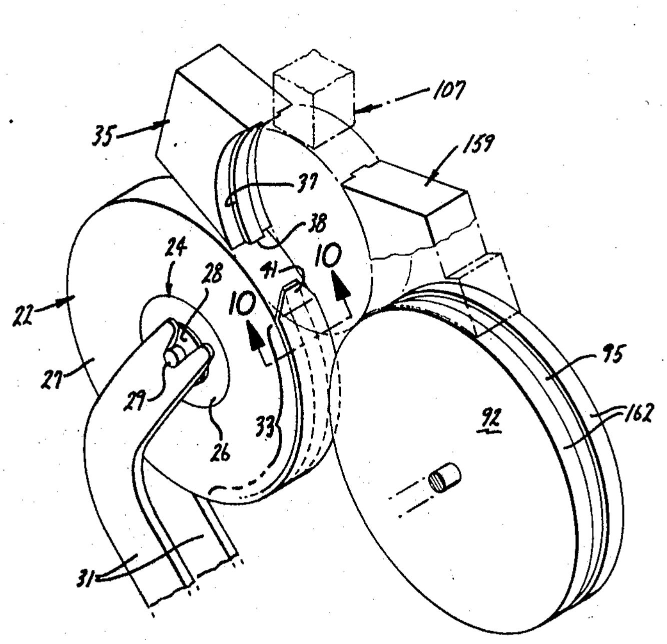
Fig. 8
Fig. 11
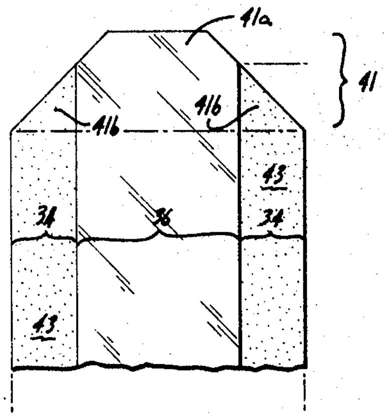
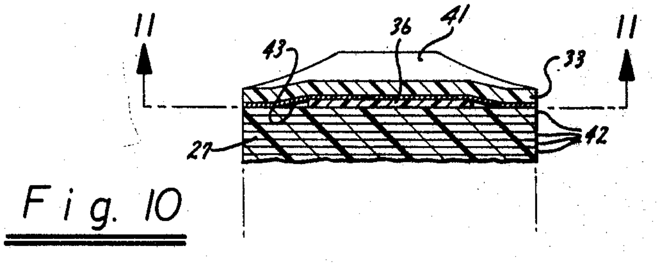
Fig. 17
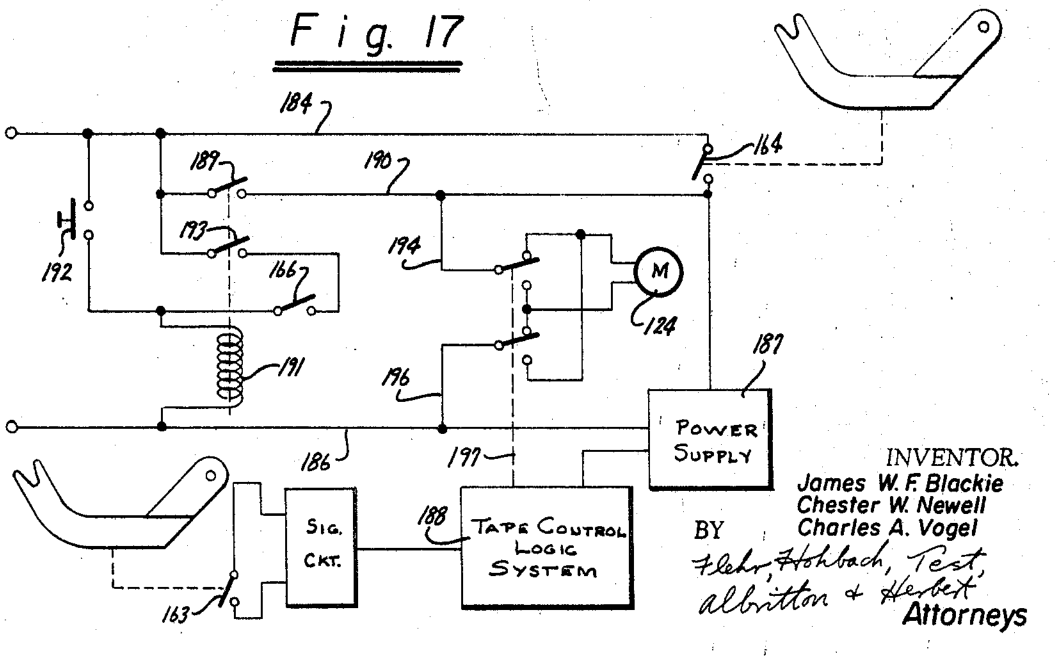
INVENTOR.
James W. F. Blackie
Chester W. Newell
Charles A. Vogel
BY
Flehr, Hohbach, Test, Albritton & Herbert
Attorneys INVENTOR.
James W. F. Blackie
Chester W. Newell
BY Charles A. Vogel
Flehr, Hohbach, Test, Albritton & Herbert
Attorneys INVENTOR.
James W. F. Blackie
Chester W. Newell
BY Charles A. Vogel
Fehr, Hohbach, Test, Albritton & Herbert
Attorneys

TAPE ROLL HANDLING APPARATUS AND ROLL THEREFOR

Filed Nov. 3, 1967 9 Sheets-Sheet 7

INVENTOR.
James W. F. Blackie
Chester W. Newell
Charles A. Vogel
BY Flehr, Hohbach, Test, Albritton & Herbert
Attorneys INVENTOR.
James W. F. Blackie
Chester W. Newell
Charles A. Vogel
BY
Flehr, Hohbach, Test, Albritton & Herbert
Attorneys INVENTOR.
James W. F. Blackie
Chester W. Newell
Charles A. Vogel
BY
Flehr, Hohbach, Test, Albritton & Herbert
Attorneys United States Patent Office 3,526,406

Patented Sept. 1, 1970

3,526,406

TAPE ROLL HANDLING APPARATUS AND ROLL THEREFOR

James W. F. Blackie, Sunnyvale, Chester W. Newell, San Jose, and Charles A. Vogel, Sunnyvale, Calif., assignors, by mesne assignments, to Newell Industries, Inc., a corporation of California Filed Nov. 3, 1967, Ser. No. 680,384

Int. Cl. G11b *15/12, 12/32, 23/02*

U.S. Cl. 274—4 13 Claims

ABSTRACT OF THE DISCLOSURE

A tape transport system for automatically playing a number of rolls of tape of a type wherein the outermost convolution of the tape roll carries the end of the tape. A tape transport assembly is positionable to any one of several tapes for playing same. Each tape is automatically threaded onto the tape transport assembly for playing. Tapes play in each of two opposite directions whereby after the entire tape has been played, it will have been rewound. The tapes are characterized by a leader portion comprised of adherent margins and a non-adherent centrally disposed strip which cooperates with a peeling element of the transport.

BACKGROUND OF THE INVENTION

This invention pertains to apparatus for handling recording tape and to a roll for cooperating with such apparatus. More particularly, this invention pertains to a system for transporting tapes wrapped to form individual supply rolls of a type wherein an end of the tape is disposed on the outer periphery of the roll.

Various arrangements for transporting (hereinafter referred to as "playing") one of several recording tapes have heretofore been employed. Typically, such arrangements rely upon the use of an endless tape carried within individual cartridges or employ so-called casettes wherein both a supply roll and a take-up roll have been pre-loaded and pre-threaded, one to the other for utilization as a unit to be applied to the transport mechanism.

Both of the above arrangements, therefore, avoid the usual need to thread the tape past a transducer. Therefore, each is ready for playing upon insertion into the apparatus.

This advantage, however, is obtained at the expense of the additional cost of the special containers, such as cartridges and casettes, and the extra manufacturing labor required for pre-loading the special container with tape. In neither of the foregoing styles of apparatus is an uncased tape roll employed.

It is, therefore, a general object of the present invention to provide an improved tape handling apparatus and cooperating roll, and further for selectively playing one of several tape rolls.

A further object is to provide a transport apparatus for automatically playing a roll of a type which carries an end of its tape on the outer periphery of the roll and where the roll is loosely deposited in a storage zone to be entered by the transport mechanism for playing the roll.

It is another object of the invention to provide a tape handling system characterized by a transport positionable to play a selected one, or a series, of tape rolls.

It is another object of the invention to provide a readily removable magazine adapted to contain a number of uncased tape rolls held loosely and removably in the magazine for ready replacement and substitution as desired.

It is another object of the invention to provide a tape transport apparatus with a transducer assembly carried to automatically accommodate the introduction of tape being threaded between supply and take-up rolls.

It is a further object of the invention to provide a transducer assembly to ride freely, in closely defined guide ways, upon tape being transported between supply and take-up rolls. And a further object is to provide such a transducer assembly wherein the recording/reproducing gap can be readily oriented with respect to the tape movement in a plurality of mutually perpendicular planes, one of the planes including the tape being transported.

It is yet another object of the invention to provide an improved length of pliable recording tape wrapped to form a supply roll of a type characterized by an adherent leader portion serving to hold the outermost convolution to the penultimate outermost convolution of the roll.

It is yet another object of the invention to provide an improved tape roll of an uncased type for being loosely lodged in means forming a storage zone or a number of such zones and which means is readily removable from the tape transport system for replacement of the rolls.

It is a further object of the invention to provide an improved system for automatically playing a series of recording tape rolls.

These and other objects of the invention will be more readily apparent from the following detailed description of a preferred embodiment when considered in conjunction with the accompanying drawings.

DESCRIPTION OF THE DRAWINGS

FIG. 8 is a perspective diagrammatic view showing a portion of the automatic tape feeding arrangement of the system, according to the invention;

FIG. 10 is a section view of a roll of tape, taken along lines 10—10 of FIG. 8;

FIG. 11 is a plan view in enlarged detail showing the outer end of a roll of tape;

FIG. 17 shows a schematic wiring diagram for operation of the apparatus, according to the invention.

SUMMARY OF THE INVENTION

In general, there has been provided a tape transport apparatus of a type adapted to support a length of pliable recording tape wrapped to form supply and take-up rolls along with means forming a storage bin capable of individually supporting each of a plurality of uncased tape rolls. The tape rolls are of a type where an end of the length of tape is disposed on the outer periphery of its associated roll. The tape transport cooperates with the individual rolls in the bin so as to pick up and feed the outer end of selected ones of the rolls for transducing signals relative to the tape of that selected roll. The tape transport serves to play a single roll or a series of rolls arranged in predetermined sequence.

The tape rolls referred to above generally are characterized by a leading portion of the tape formed with laterally disposed elongated surface portions. One such portion is characteristically adherent and disposed to hold the outermost convolution of the roll to the penultimate outermost convolution of the roll. Another elongated surface portion lies adjacent to the adherent portion and is characteristically non-adherent and thicker than the adherent portion whereby the thickness of the non-adherent portion is such as to be insufficient to prevent the longitudinal edges of the adherent portion from being pressed or deformed into adhering engagement with the penultimate convolution of the tape roll so as to hold the outermost convolution to the roll. The thickness of the non-adherent portion is, however, sufficiently thick so that when fed between the transducer and the capstan of the transport, the transducer will be urged away from the plane of the tape to provide a sufficient clearance to permit the adherent portion to pass clear of the transducer, even though passing in confronting relation thereto.

In the above arrangement, it is further clear that the roll being played remains in the magazine while being unwound and rewound. Thus, the roll's storage zone in the magazine serves to contain any remaining wound portions of each of the selected rolls as the transport picks up the end of the tape and withdraws the tape from the roll for playing. Rolls are played in both directions whereby the need for rewinding the tape following the conclusion of a selection is rendered unnecessary. A number of rolls can be played until the end of the "program" of rolls is reached.

DESCRIPTION OF THE PREFERRED EMBODIMENT

Figure 1:
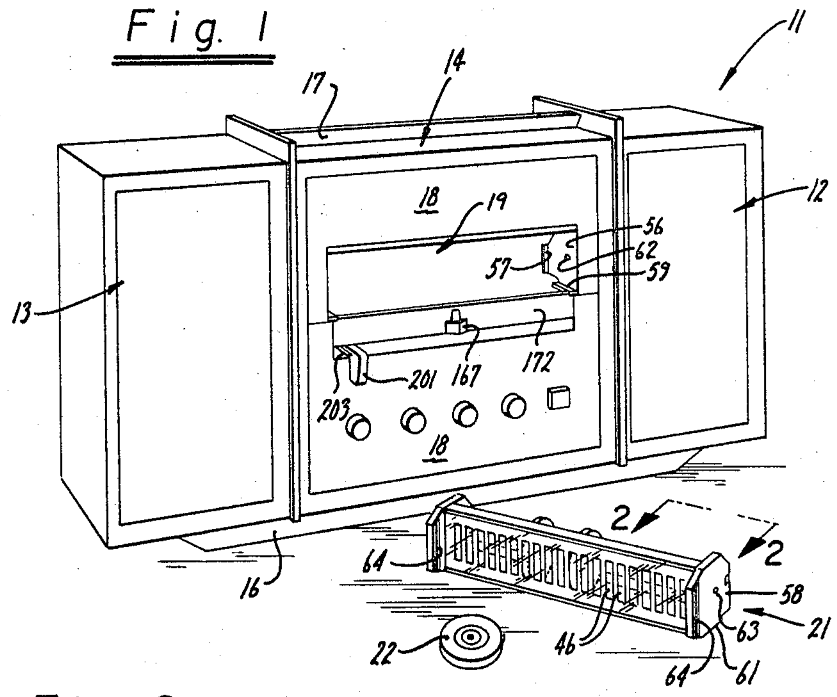
FIG. 1 is a perspective view showing a tape changing system, according to the invention.

A magnetic tape console 11, shown in FIG. 1, generally comprises a three-part cabinet including a pair of laterally spaced speaker assemblies 12, 13 and a housing 14 containing a tape transport assembly 23. Assemblies 12, 13 and 23 are all supported upon a common base 16 and arranged to be carried as a unit by means of an extensible handle 17. Suitable control knobs project through a front cover panel 18. Panel 18 includes a longitudinally extending window 19 into which is placed a readily removable magazine assembly 21.

Magazine assembly 21 is adapted to be inserted into window 19 whereby any one of a number of rolls 22 of tape, or a sequence of rolls 22, can be played by the positionable tape transport assembly 23.

MAGAZINE ASSEMBLY AND TAPE ROLLS THEREFOR

A readily removable magazine assembly 21 is adapted to support a number of uncased tape rolls 22 of a type wherein an end of the tape roll is disposed on the outer periphery of the roll.

Each of tape rolls 22 includes a cylindrical hub 24 of essentially solid, imperforate construction including side face portions 26 on opposite sides of the hub. A length of recording tape 27 is wrapped tightly around hub 24 so as to form successive convolutions around the hub.

The side edges of tape 27 lie substantially in planes which are flush with the side face portions 26 of hub 24. A coaxial shoulder portion 28 extends axially outwardly of each side face portion 26 for the purpose described below. A support protuberance 29 is formed axially to each side of hub 24 and adapted to form a supporting axle for roll 22. Protuberances 29 are adapted to be engaged and supported for rotation by laterally spaced fork elements 31, each of which is formed with a notch 32 adapted to engage an associated one of the protuberances 29 and to lift and lower each roll 22 for cooperation with a tape drive capstan 81 described below.

The coaxial shoulder portions 28 serve to preserve a predetermined clearance between the spaced fork elements 31 and the respective side edges of the tape convolutions and thereby permit unfettered rotation of the roll.

Each tape roll further includes means for releasably adhering the outermost convolution of tape 27 to the penultimate outermost convolution.

As shown in FIG. 10, the tape record convolutions 42 are kept from unwinding by virtue of the leader portion 33. Leader portion 33 carries a layer of adhesive material 43, preferably of the pressure sensitive type and along which layer 43 there has been disposed a narrow strip of recording tape forming the unadhered strip 36.

Thus, a leader portion 33 defines the outer convolution of roll 22 and is provided with margins 34, prepared with a pressure sensitive adhesive material as on conventional masking tape, to be releasably adhered to the penultimate outermost convolution. A longitudinally extending unadhered portion is disposed intermediate the margins 34 so as to define a nonadherent surface adapted to be engaged by a wedging element, in the form of the spade element or rib 37 having a blade 38 adapted to enter between the outermost and penultimate outermost convolution of tape and thereby release the grip of the outermost convolution.

The intermediate, unadhered portion of tape is thicker than the marginal portions 34 so as to be adapted to urge a transducer assembly 39 to an upward position spaced from the surface of the adhesive margins 34. In this manner, the recording gap of transducer assembly 39 is spaced from riding in contact with the adhesive margins of leader 33.

The outer end of the length of tape on each of rolls 22 is characterized by an unadhered tab portion 41 adapted to be picked up by blade 38 as the roll of tape is rotated in a direction to thread the tape for playing. Thus, as shown in FIG. 11, tab portion 41 comprises a portion **41*a* formed of the extra thickness of recording tape and the triangular sections 41*b* which, while carrying a slight amount of adhesive material, are of quite limited area for tape widths on the order of one-quarter inch, for example, so that in response to the natural tendency of the tape to seek its own plane portions 41*b*** fail to adhere to the roll.

Rolls of tape 22 rest loosely upon their peripheries within individual storage zones 69 within a magazine assembly 21. Each roll is thus in a position adapted to be engaged and played by the tape transport while being unwound as it remains within magazine 21.

Magazine assembly 21 includes a front wall 44 adapted to provide a series of individual viewing windows 46 aligned with a corresponding roll of tape 22.

Front wall 44 consists of a rigid panel 47 extending transversely of console 11. A series of elongated vertically oriented inspection openings 48 are formed in panel 47. Several layers of transparent plastic sheets 49 cover the outer ends of openings 48 so as to generally protect the interior of console 11.

Each magazine assembly 21 further includes end panels 51 adapted to fit into window 19 and further serving to support an elongated roll support rod 52 therebetween. Rod 52 is alternately sub-divided into portions of larger and smaller diameter whereby a series of uniformly spaced collars 53 serve to define a roll receiving space 54 therebetween aligned with an associated one of inspection windows 46.

Means serving to support magazine assembly 21 within window 19 includes the two laterally spaced support plates 56 attached to panel 18. Each plate 56 includes an upwardly extending inwardly turned flange portion 57 adapted to engage the leading edge 58 of magazine 21 on insertion of magazine assembly 21 into window 19. Another flange portion 59 of plates 56 forms a horizontal ledge adapted to underlie and support the assembly 21 by engagement with the lower edge 61 of each end panel 51. In order to be securely retained within window 19, spring loaded ball detents 62 are disposed in the faces of plates 56 and adapted to engage a small cooperating pocket 63 formed in the face of each end panel 51.

In order to be able to withdraw magazine assembly 21 from window 19, each end panel 51 includes outwardly projecting tab portions 64 formed with serrated surfaces adapted to permit panels 51 to be conveniently gripped, whereby assembly 21 can be readily withdrawn from window 19 merely by pulling upon tab portions 64.

Figure 4A:
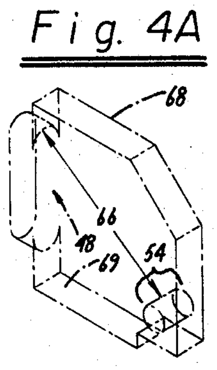
FIG. 4 is an end view, in section, taken along the line 4—4 of FIG. 2.
Figures 2, 3, 4:
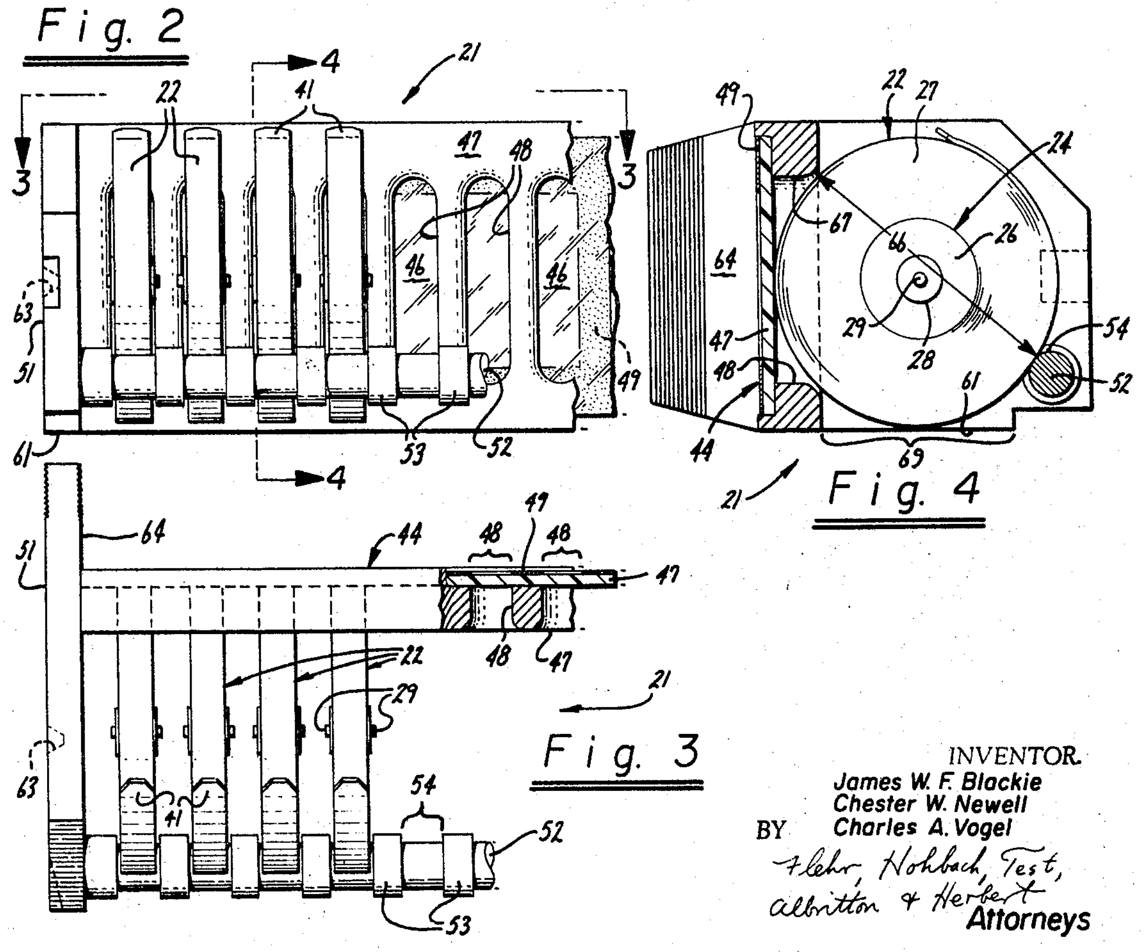
FIG. 2 is an elevation view in enlarged detail taken along the line 2—2 of FIG. 1.
FIG. 3 is an enlarged plan view, partially in section, taken along the line 3—3 of FIG. 2.

From the foregoing description, and FIG. 4 of the drawing, it will be readily evident that the spacing 66 between support rod 52 and the upper edge 67 of window opening 48 (FIG. 4A) forms a receiving space which accommodates entry of each uncased roll 22 into its own separate storage zone 68.

Thus, each discrete storage zone 68 is defined by one of the spaces 54 adapted to receive the edge of the roll therein and a slot formed by opening 48 bounding the sides of the roll and extending across a chord thereof. The bottom of zone 68 includes an access opening 69 defined between rod 52 and the rear of panel 47. Access opening 69 accommodates entry of the roll engaging fork elements 31 for supporting the roll in playing position.

TAPE TRANSPORT

Within the cabinet of console 11, a pair of transversely extending parallel ways 71, 72 are secured to the end walls of the cabinet and arranged to support a tape transport assembly 23 for movement into alignment with the plane of a tape roll, or the planes of a sequence of tape rolls, as now to be described.

A transport frame 73 comprised of a pair of rigid, laterally spaced transport carriage plates 73*a*, 73*b* held in laterally spaced relation by transversely extending spacer rods 75, support transport assembly 23 for movement along ways 71, 72. Frame 73 is provided with guide rollers 74, 76 respectively at the front and back side of frame 73 and journalled upon axles supported by transversely disposed flap or tab portions 77.

Assembly 23 moves laterally along the length of ways 71, 72 by means of a constant force spring 78 of a type wherein an elongated band of spring material is adapted to be rolled and unrolled from a spool as mounted upon an axle 79. The spring characteristic is such that notwithstanding variations in the degree of unrolling or rolling relative to the spool, the spring force will, nevertheless, remain at a substantially constant value. Thus, the end of spring 78 is attached at the right (as shown) to a fixed portion of housing 14 while the axle 79 of the spring's spool is carried by frame 73. Thus, a constant biasing force serves to urge the carriage frame 73 laterally in a predetermined direction along the length of ways 71, 72.

As noted above, assembly 23 can be positioned to the positions for any one of a number of tape rolls 22 and is arranged whereby assembly 23 will play one or a series of rolls until the lateral movement of carriage frame 73 and assembly 23 is arrested.

Accordingly, as described further below, an escapement mechanism (FIG. 12) is operated by the successive tape loading and unloading operations of tape transport assembly 23.

Transport assembly 23 includes a capstan 81 of a type formed with a resilient tire 82 disposed therearound bounded at its end edges by flanges 83. Flanges 83 are preferably in substantially edge-guiding relation to the edges of tape rolls 22 when rolls 22 are disposed in playing position.

Means for positioning a roll 22 of tape into engagement with the rotating arcuate surface portions of tire 82 includes a supply roll yoke 84 which carries fork elements 31 attached to a downwardly depending mounting block 86. The distal ends of elements 31, as noted above, include the notches 32 adapted to receive the protruding stub shafts or protuberances 29 of an aligned roll 22.

A carriage advancing trigger element 87, attached to depend downwardly from the underside of yoke 84, operates an escapement mechanism as described further below to advance assembly 23 along ways 71, 72.

Yoke 84 pivots between retracted and advanced positions by means of an axle 88 fixed to yoke 84 for supporting same.

Means serving to yieldingly urge yoke 84 upwardly toward its advanced position includes a bias spring 89, hereinafter referred to as the "supply" bias spring 89. The lower end of spring 89 is attached to a transversely extending anchor rod 91 secured to yoke 84. The upper end of spring 89 is fixed to a stationary portion of carriage 73.

Assembly 23 includes a take-up hub 92 (FIG. 7) preferably of a light-weight plastic material and formed with a diameter whereby the circumference of hub 92 will correspond essentially to the length of leader 33. In this manner, the leader when wrapped about hub 92 will substantially eliminate the formation of a bump in the periphery of the take-up roll. The hub periphery includes a groove 95 to accommodate the thicker central strip 36 on leader 33.

Take-up hub 92 is journalled for rotation between the arms 93 of a pivotally mounted take-up yoke 94. Yoke 94 pivots about an axis 96 formed by axle 97 whereby take-up hub 92 can advance and retreat as tape is wound and unwound therefrom.

Means for yieldingly urging hub 92 into resilient engagement with tire 82 of capstan 81 includes the take-up bias spring 98 secured at its lower end to a rod 99 about which hub 92 is free to rotate. The upper end of spring 98 is attached relative to frame 73 to an adjustable anchor pin 100 slidably positionable in slot 105.

Springs 89 and 98 produce forces whereby a supply roll 22 of tape and take-up hub 92 will both be substantially equally yieldingly drawn into engagement with the resilient portion of tire 82 upon capstan 81. Means are provided, however, for varying the compressive forces applied whereby as tape is fed from supply roll 22 to take-up hub 92 the compressive force will be greater at the interface existing between take-up hub 92 and capstan 81.

When the tape is fed in a reverse direction, as will be explained further below, the comperssive force is greater at the interface formed between the roll of tape 22 and capstan 81 than between take-up hub 92 and capstan 81. Thus, during reversal, hub 92 constitutes the "supply" roll as tape is returned onto hub portion 24 of each roll 22. For clarity, however, and notwithstanding the fact that hub 92, under rewinding conditions, serves to constitute the "supply" roll, hub 92 will be hereinafter referred to as a take-up hub 92.

Notwithstanding the foregoing reversals in function in hubs 92 and 24, tape transport assembly 23 is arranged whereby a greater compressive force naturally occurs at that side of capstan 81 where the take-up function exists. In this manner, the loop of tape wrapped about capstan 81 will be maintained under appropriate tension.

Means serving to vary the compressive forces applied to the capstan surface includes the clamps 101, 102. Each clamp 101, 102 is disposed in fixed relation to carriage 73 and includes a pair of opposed jaws 103*a*, 103*b*. Jaws 103 yieldingly grip axle 97 or 88 so as to apply a resistance to the advancing and retreating movements of yokes 84, 94.

Preferably clamps 101, 102 are of a material such as Delrin or the like so as to provide a relatively smoothly applied frictional resistance to the rotation of axles 88, 97, thereby eliminating any jerky advancing or retracting movements of the yokes 84, 94 associated therewith.

By virtue of clamps 101, 102 and the frictional restraint applied thereby to the advancing and retracting movements of yokes 84, 94, it will be apparent that the otherwise equal compressive forces applied by means of springs 89, 98 will be varied by the degree of frictional resistance applied by clamps 101, 102. The applied resistance will be applied in a direction whereby the frictional resistance of clamp 101 serves to substract from the compressive force formed by spring 89 as tape is fed from roll 22 onto take-up hub 92. Clamp 102, on the other hand, at such times, will serve to add to the compressive force applied between capstan 81 and hub 92 by spring 98.

During reverse feeding of tape about capstan 81, it will be apparent that the function of clamps 101, 102 is naturally reversed whereby as hub 92 functions as a supply roll, clamp 102 will serve to subtract from the compressive force generated by spring 98 while clamp 101 serves to add to the compressive force provided by spring 89. Reference is made to co-pending application S.N. 556,-117, now U.S. 3,370,804, assigned to the assignee herein.

Tape 27 includes a number of laterally disposed record tracks. Transducer head 107 includes transducing gap portions for cooperating with selected tracks. When tape travels in one direction the head is switched to transduce signals with respect to one set of tracks and when reversed, head 107 is switched to transduce signals with respect to another set of tracks.

TRANSDUCER ASSEMBLY

A transducer assembly 39 for cooperating with tape as supported by capstan 81 is arranged and supported to yieldingly move between advanced and retracted positions in continuous transducer relation with respect to the tape. Assembly 39 is further adjusted in azimuth and zenith.

Figures 6, 7:
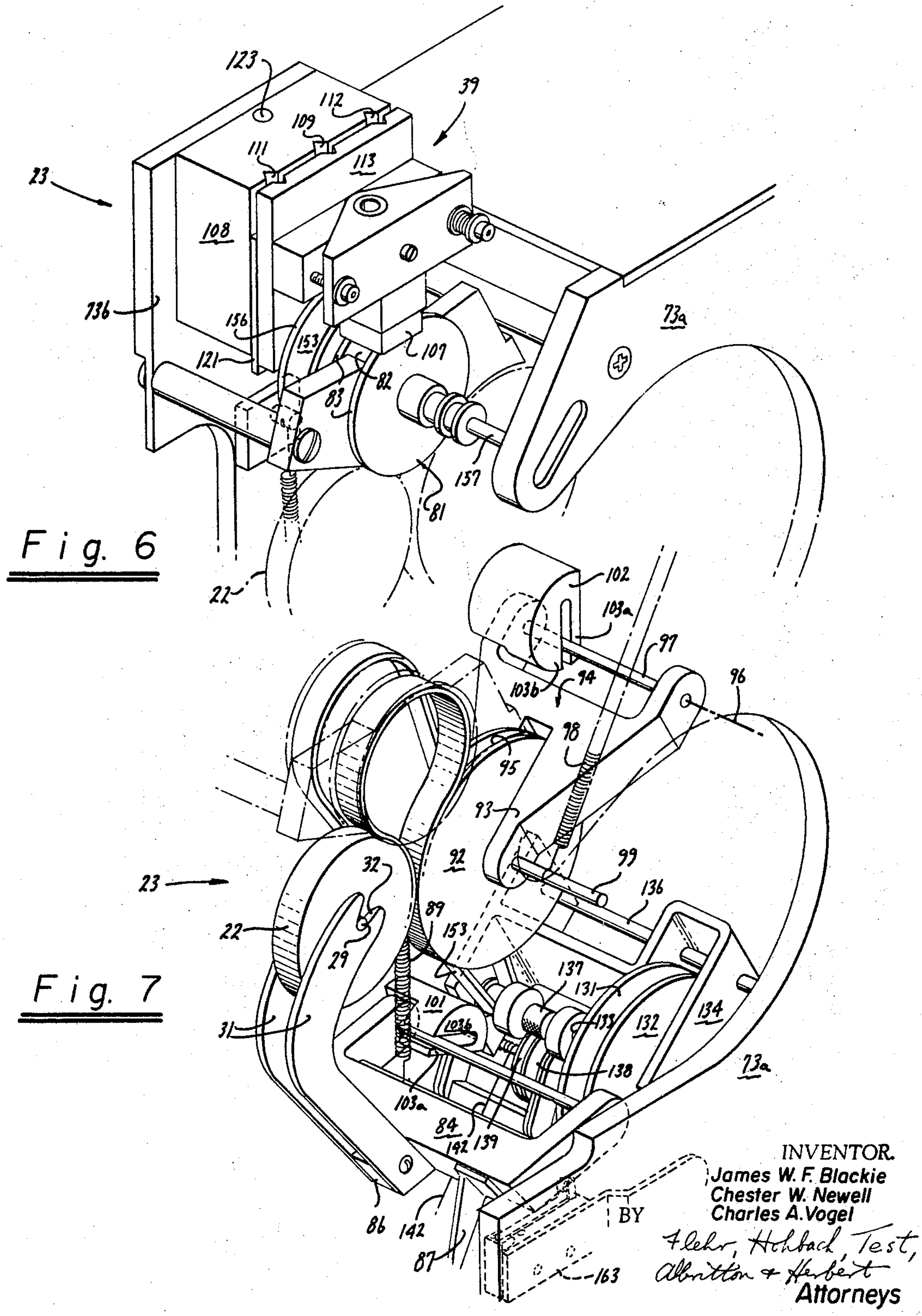
FIGS. 6 and 7 are each enlarged detail perspective views showing respectively the upper and lower portions of a tape transport assembly, according to the invention.
Figure 9:
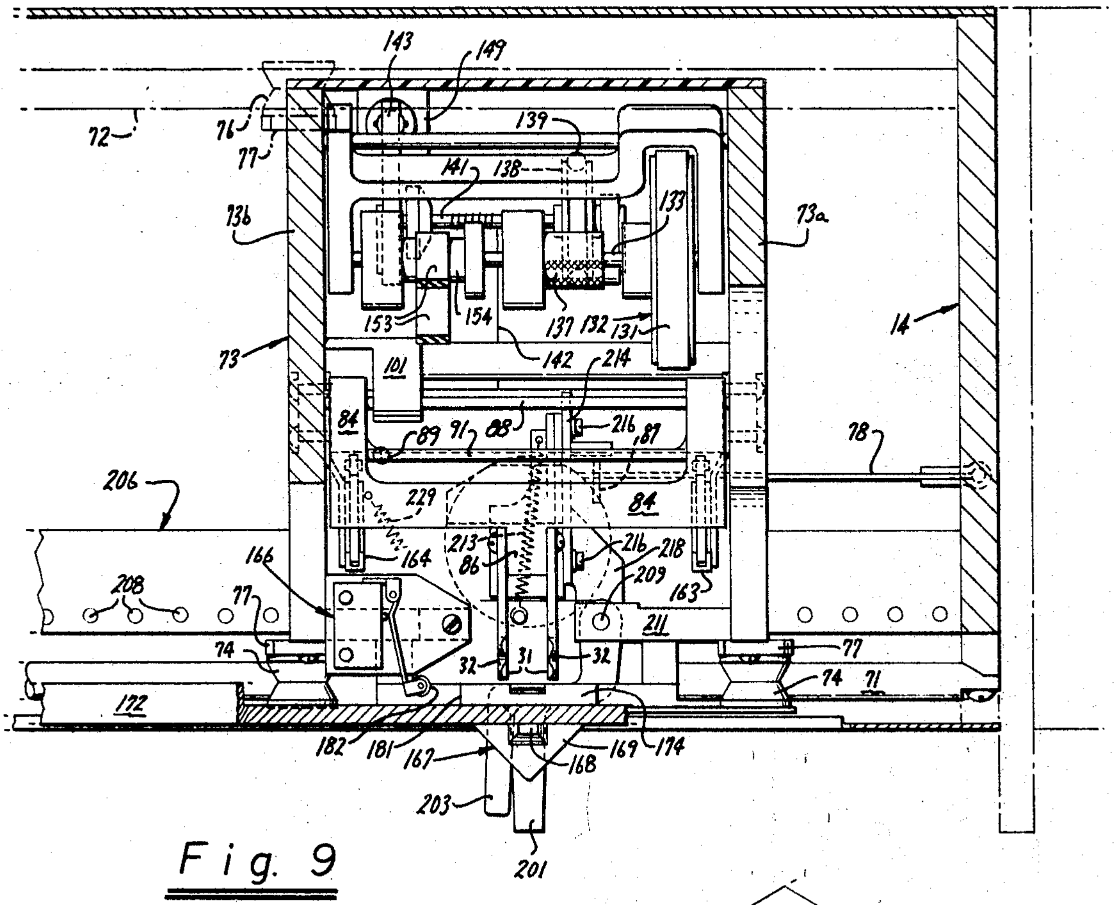
FIG. 9 is a plan view of a tape transport assembly taken along the line 9—9 of FIG. 5.
Figure 15:
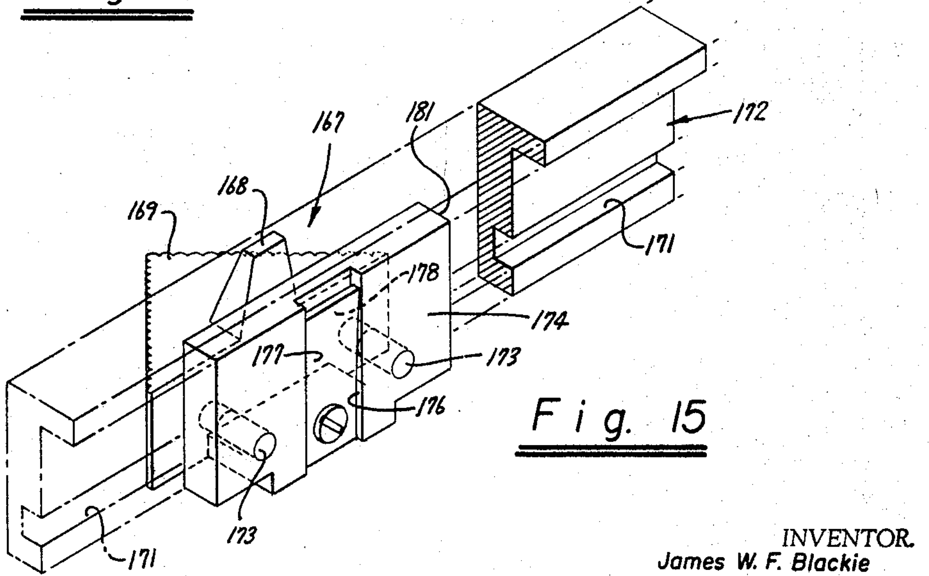
FIG. 15 is a perspective view in enlarged detail showing the roll selection stop mechanism.

Thus, as shown in FIG. 6, transducer head 107 includes a conventional transducer element (not shown) therebeneath for cooperating with tape wrapped about capstan 81. A mounting base 108 is formed with three channels 109, 111, 112. A movable bearing plate 113 is yieldingly held and urged toward base 108 by means of a spring 114 anchored at one end to plate 113 and at its other end to screw 123 carried in base 108 attached to the fixed wall **73*b*. The loop of spring 114 is formed around screw 123**.

Three ball bearings 117 are captured in the opposed channels 109, 111, 112 and held in holes or pockets 119 formed in a ball retainer spacer sheet 121. Sheet 121 is preferably of an anti-friction material, such as Delrin, or other suitable plastic. As thus arranged, it should be apparent that plate 113 is free to rise and fall on the ball bearings 117 so as to move in very closely controlled and confined guide ways as formed by channels 109, 111, 112.

A resilient restrain is applied to the movement of plate 113 by means of spring 114 whereby spring 114 tends to draw plate 113 to a "centered" position adapted to coincide with substantially the correct contact pressure for transducer head 107 as it rides against the tape surface. If it is desired to adjust the compression, such adjustment can readily be accomplished merely by adjusting the screw 123.

REVERSIBLE DRIVE

Means are provided whereby transport assembly 23 can pick up one of rolls 22 and thread the tape therefrom automatically onto take-up hub 92. Accordingly, drive means as now to be described, serves to operate assembly 23 so as to provide self-threading and playing of the tape in each of two opposite directions.

Figure 5:
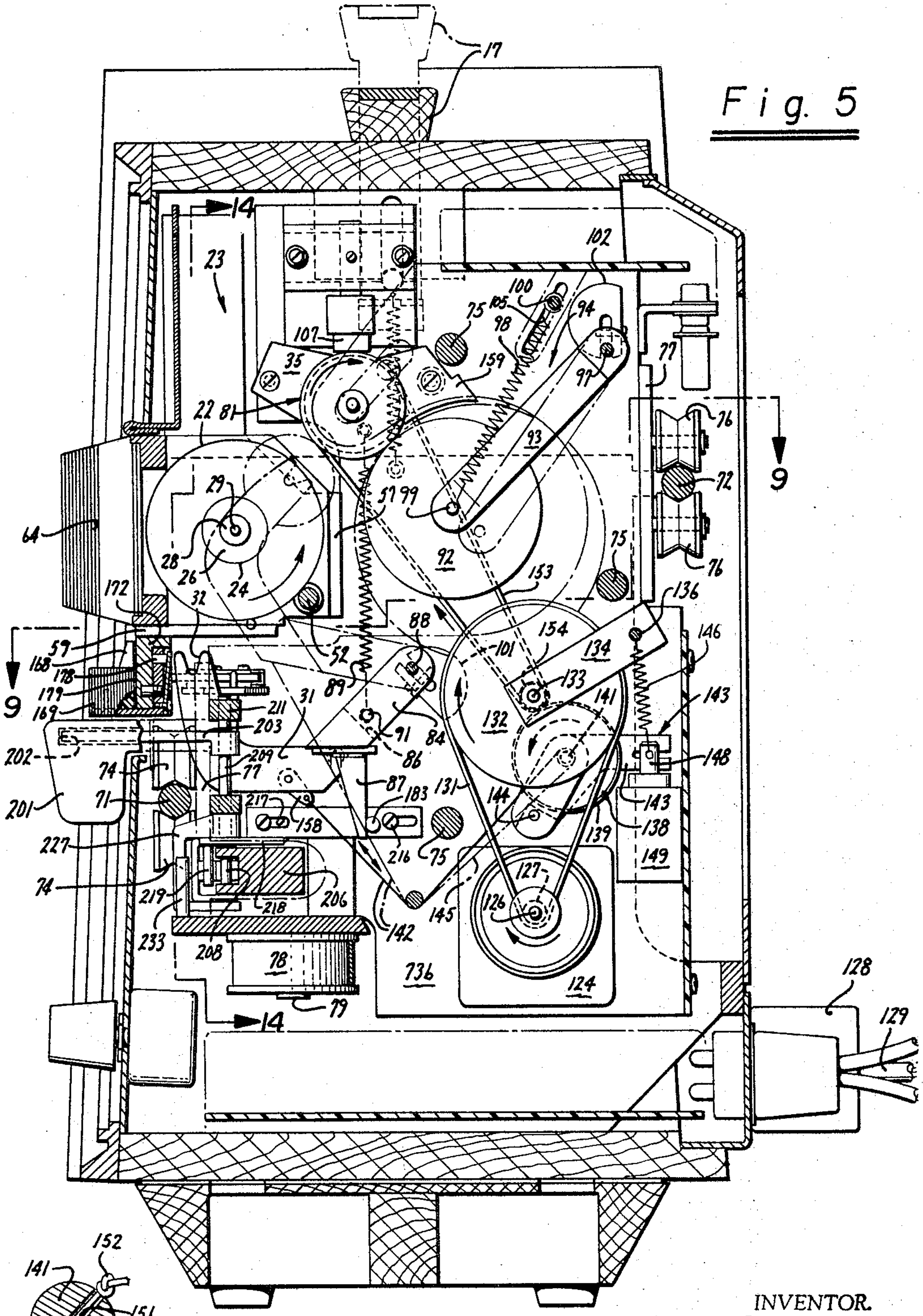
FIG. 5 is an end elevation view, in section, taken along the line 5—5 of FIG. 13.

Referring to FIGS. 5 and 7, the drive means as now to be described serves to provide, with light-weight components, the stability and smooth running performance of a relatively large rotating mass, and which drive means is readily and quickly reversible for reversing the direction of movement of a tape being played.

Thus, an electric motor 124 includes an output shaft 126 and pulley 127 attached thereto. Motor 124 receives power from a power plug 128 attached to power line 129.

An elastic main drive belt 131, trained about pulley 127 and a large diameter brass flywheel forming a reduction pulley 132, serves to rotate a power take-off shaft 133 secured thereto and journalled in the distal ends of a generally U-shaped shaft support bracket 134. Bracket 134 is pivotally mounted at its proximal ends upon a pivot rod 136. Thus, shaft 133 serves to provide the main power take-off for the system.

Shaft 133 carries a knurled relatively small diameter friction drive hub 137 (FIG. 7) which cooperates with and drives at cable control drive wheel 138. Wheel 138 is formed as a sheave containing a rubber tire 139, such as an O-ring of a type and size adapted to bulge somewhat beyond the perimeter of the sheave. Wheel 138 is carried upon a winding shaft 141 which, when rotated, serves to pay out and reel in the control cable 142.

Cable 142 can be wound and unwound at appropriate times during the operation of the system by virtue of the fact that cable control drive wheel 138 can be selectively moved into or out of engagement with the continuously rotating power take-off hub 137 on shaft 133. Thus, wheel 138 is supported for rotation with winding shaft 141 which, in turn, is journalled for rotation in the knee of a bell-crank member 143, pivoted about the pivot point 144.

A spring 146, anchored at its upper end to the rod 136 and at its lower end to the movable armature 148 will draw bellcrank member 143 upwardly to engage the driving connection formed between wheel 138 and hub 137. By de-energizing solenoid 149, spring 146 serves to draw wheel 138 upwardly whereby tire 139 is frictionally driven by hub 137.

By engaging or disengaging hub 137 with wheel 138, cable 142 may be wrapped or unwrapped upon shaft 141 by controlling the direction of rotation of shaft 133. For an emergency condition, however, unwrapping and wrapping will be achieved by a single continuous rotation of shaft 133.

Figure 5A:
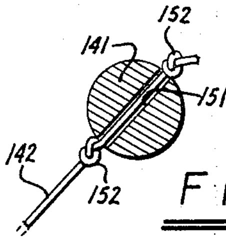
FIG. 5A is an enlarged detailed view, in section, showing means for attachment of the end of cable 142 to axle 141.

Thus, with reference to FIG. 5, arrows have been applied to indicate a given direction of rotation for pulleys 127, 132 and shaft 141. This normally is merely reversed to reverse the operation of cable 142. It will be apparent that for the direction of rotation of pulley 127 (FIG. 5), cable 142 will pay out so long as cable 142 unwinds from the topside of shaft 141. The bitter end of cable 142 is suitably attached to shaft 141 in the manner shown in the detailed view of FIG. 5A wherein a hole 151 is drilled on a diameter through shaft 141. The bitter end of cable 142 can be secured as, for example, by forming a pair of knots 152 on opposite ends of hole 151. Thus, continued rotation of shaft 141 in a given direction can serve to pay out cable 142 until the bitter end is reached whereupon continued rotation of shaft 141 serves to commence rewinding cable 142 therearound, albeit in the position shown in phantom lines 145.

A relatively inelastic capstan belt 153 provides bi-directional rotation to capstan 81 for feeding tape in opposite directions relative to transducer head 107. Thus, drive belt 153 is trained about a hub portion 154 of power take-off shaft 133 and about capstan drive pulley 156. Capstan drive pulley 156 and capstan 81 are each fixed to rotate with a journalled shaft 157.

As thus arranged, it will be readily apparent that a considerable gear reduction is achieved between the relatively high speed output of motor 124 and the rotation of capstan 81. In this manner, capstan 81 rotates with a highly uniform speed whereby any slight speed fluctuations occurring in motor 124 will be relatively un-noticed at transducer head 107 so as to give the appearance of a high mass system. Reversal, however, is quickly achieved without need to overpower a large mass.

Motor perturbations are absorbed by the mass of pulley 132 and the elastic nature of belt 131. The relatively heavy flywheel provided by pulley 132, however, is tightly coupled by the inelastic belt 153 to closely control rotation of capstan 81 in a manner somewhat simulating rotation of an integral part of flywheel 132 but with the advantage of remotely locating capstan 81. Resilient belt 131 tensions belt 153.

ROLL POSITIONING AND THREADING

Assuming, for the moment, that fork elements 31 have been laterally disposed in planes which intercept protuberances 29, the supply roll yoke 84 will be held in its retracted position by means of the cable connection formed by attaching the outer end of cable 142 to a pivotally mounted connector 158 carried between fork elements 31. Yoke 84 is, as explained above, normally urged upwardly to its advanced position by means of supply bias spring 89. By winding cable 142 upon shaft 141, cable 142 will generally be relatively taut and will serve to restrain yoke 84 against the upward urging of spring 89.

In order to pick up and "load" a given roll 22 in position to cooperate with tape capstan 81, cable 142 will be paid out by rotating shaft 141 counter-clockwise as indicated by the applied arrows in FIG. 5.

As yoke 84 moves upwardly fork elements 31 pass through access opening 69 and enter the storage zone 68 containing the particular roll 22 to be picked up by notches 32. As yoke 84 continues to be drawn further upwardly roll 22 will be carried into engagement with tire 82 on capstan 81.

By properly orienting rolls 22 within magazine assembly 21, the unadhered tab portions 41 will be disposed to extend in a direction to be engaged by blade 38 as the roll is rotated counterclockwise (as shown in FIG. 8).

Thus, tab 41 will be engaged by blade 38 and guided by rib 37 and the flanges 83 on capstan 81 to pass directly beneath transducer head 107.

As noted above, the extra thickness of leader portion 33 provided by the unadhered strip 36 serves to lift transducer head 107 and transducer assembly 39 upwardly to space the transducing gap of head 107 clear of the adhesive margins 43 confronting head 107 as leader portion 33 threads itself past transducer head 107.

Leader portion 33 is further guided onto take-up hub 92 so as to be pressed into adhering engagement therewith by means of the additional confining guide 159 formed with an arcuate guiding surface confronting tire 82 of capstan 81. The guiding surface of guide 159 corresponds generally to the confronting surface of guide 35 wherein a rib portion cooperates with the unadhered strip 36 of leader portion 33 to retain leader 33 and confine its travel.

Take-up hub 92 includes a peripheral channel or groove 95 so as to accommodate the thicker central band of leader 33 as the outer rim bands 162 of hub 92 engage the pressure sensitive adherent margins of leader 33. In this manner, tape wrapped about hub 92 presents a relatively flat surface to the captsan tire 82.

In order to accommodate enlarging and diminishing growth of roll 22 and to maintain it in contact with the surface of capstan 81 so that it may advance and retreat with respect thereto, cable 142 pays out for a limited period of time after roll 22 initially contacts tire 82 of capstan 81. Thus, some slight slack in cable 142 occurs at that time. This slack accommodates the additional movement of roll 22 toward capstan 81 as the roll diminishes with unwinding.

By a suitable control circuit of a type as shown in copending application, S.N. 648,665, and assigned to the assignee herein and entitled Tape Handling Control Element and System, or other suitable circuit, solenoid 149 will be de-energized so as to cause fork elements 31 to be moved at a proper time upwardly and thereby carry the roll into threading relation to capstan 81. Thereafter, solenoid 149 is energized by control signals as carried on tape 22.

As disclosed in the above identified application, a capstan drive means is arranged for feeding tape in a given direction and for transducing signals relative to information contained in a given track of the tape. At an appropriate time toward the end of the first pass of the tape past the transducer head, the tape drive mechanism is reversed under control of suitable signal sensing means. In order to feed the tape in a reverse direction, the tape-supporting capstan is merely driven in a reverse direction. In the present construction motor 124 is merely reversed. The control signals for reversing the tape can be placed at appropriate locations whereby some tape will always remain upon the roll hub 24.

Accordingly, a need for self-threading of the tape in a reverse direction is not particularly necessary, though it is not inconceivable that self-threading in a reverse direction could be readily accomplished in a means comparable to the above described threading means by provision of a leader portion 33 at the inner end of the tape on roll 22.

Ultimately, during the reverse driving mode of operation of the system as shown in FIG. 5, tape will be unthreaded and as leader portion 33 is withdrawn from capstan 81, the pressure sensitive adherent margins will be pressed by capstan 81 to attach leader 33 to the penultimate outermost convolution of roll 22 and thereby essentially "seal" roll 22 as a self-contained, uncased roll to be re-deposited into its associated position within storage zone 68 of magazine 21.

Following the re-deposit of roll 22 in its associated storage zone, yoke 84 will continue downwardly so as to withdraw from zone 68 and drop well clear of the lower edge of magazine assembly 21. This withdrawing movement of yoke 84 is accomplished by the winding of cable 142 upon the cable winding shaft 141 by virtue of the de-energized state of solenoid 149.

A micro-switch 163 serves to sense the arrival of yoke 84 at its lowermost position by simply closing a circuit which provides an "on" signal to the lead "41" as shown in the last above identified patent application. This "on" signal serves to reset direction flip-flop 42 shown in the above referenced patent application so as to condition motor 124 to operate in its forward driving mode as shown by the arrows applied to FIG. 5 herein. Thus, the direction flip-flop 42 (of the above identified application) will remain in its "reset" state until another input serves to "set" the flip-flop.

In the foregoing manner, the system is conditioned to operate in the forward mode of operation so as to be ready to feed tape from the next subsequent roll of tape to be carried into engagement with capstan 81 by yoke 84.

An escapement mechanism releases transport assembly 23 to move from one roll position to the next by means to discrete movements. Thus, transport assembly 23 is released to move one-half step at a time in advancing from a given roll position to the next.

After a program of one or more tapes is completed, it is desired to de-energize power to the system. This must occur with yoke 84 in its lowered position and only after all tapes of the program have been played. Means for indexing tape transport assembly 23 to step from one position to the next until a preselected location is reached are provided whereupon tape transport assembly 23 will be precluded from further movement thereatfer. This latter position is hereinafter referred to as the end-of-program position. A program, therefore, is to be considered as including the playing of one or more rolls 22 of tape.

Figure 12:
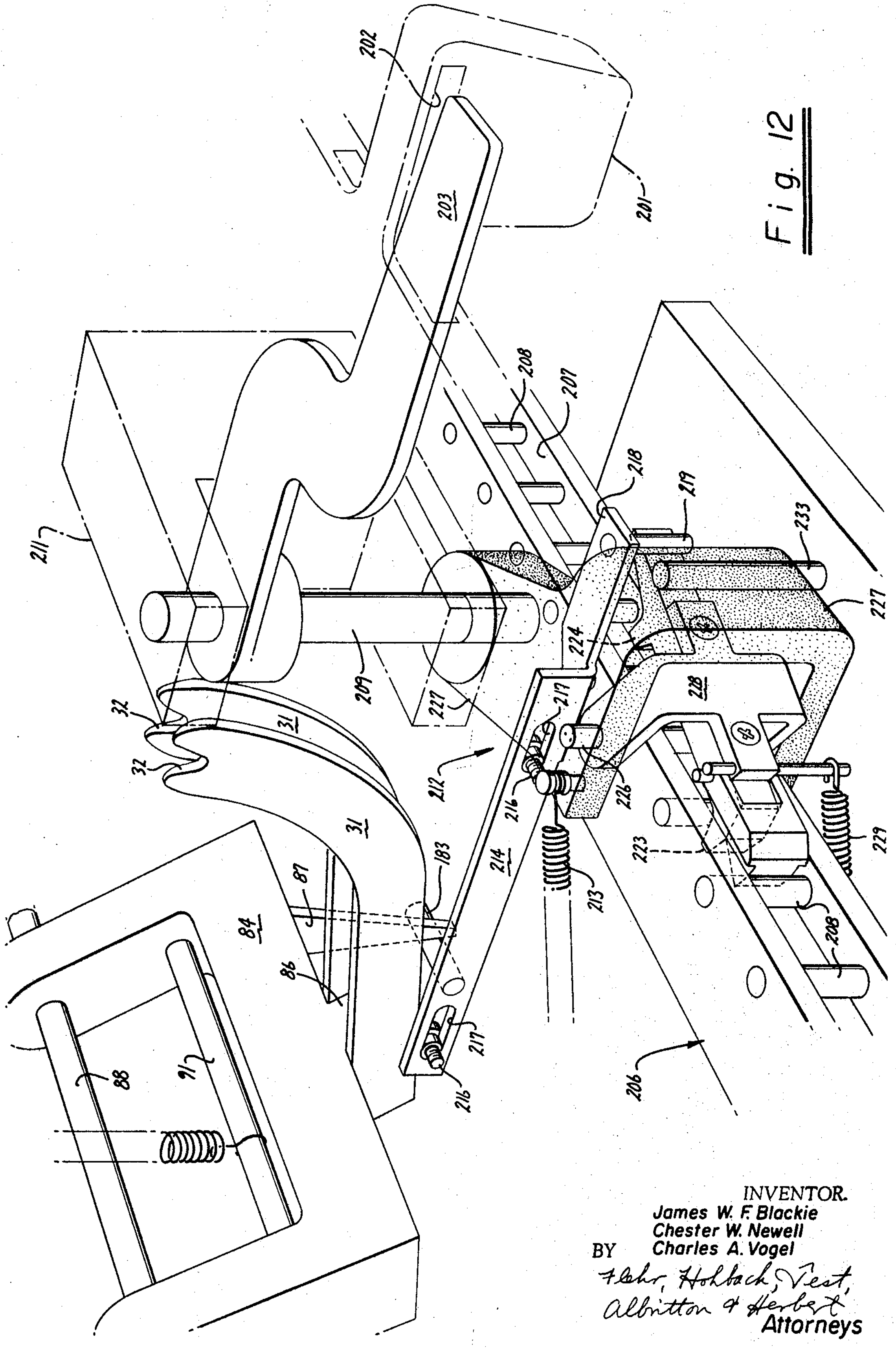
FIG. 12 is a perspective view showing in enlarged detail the escapement mechanism, according to the invention.
Figure 13:
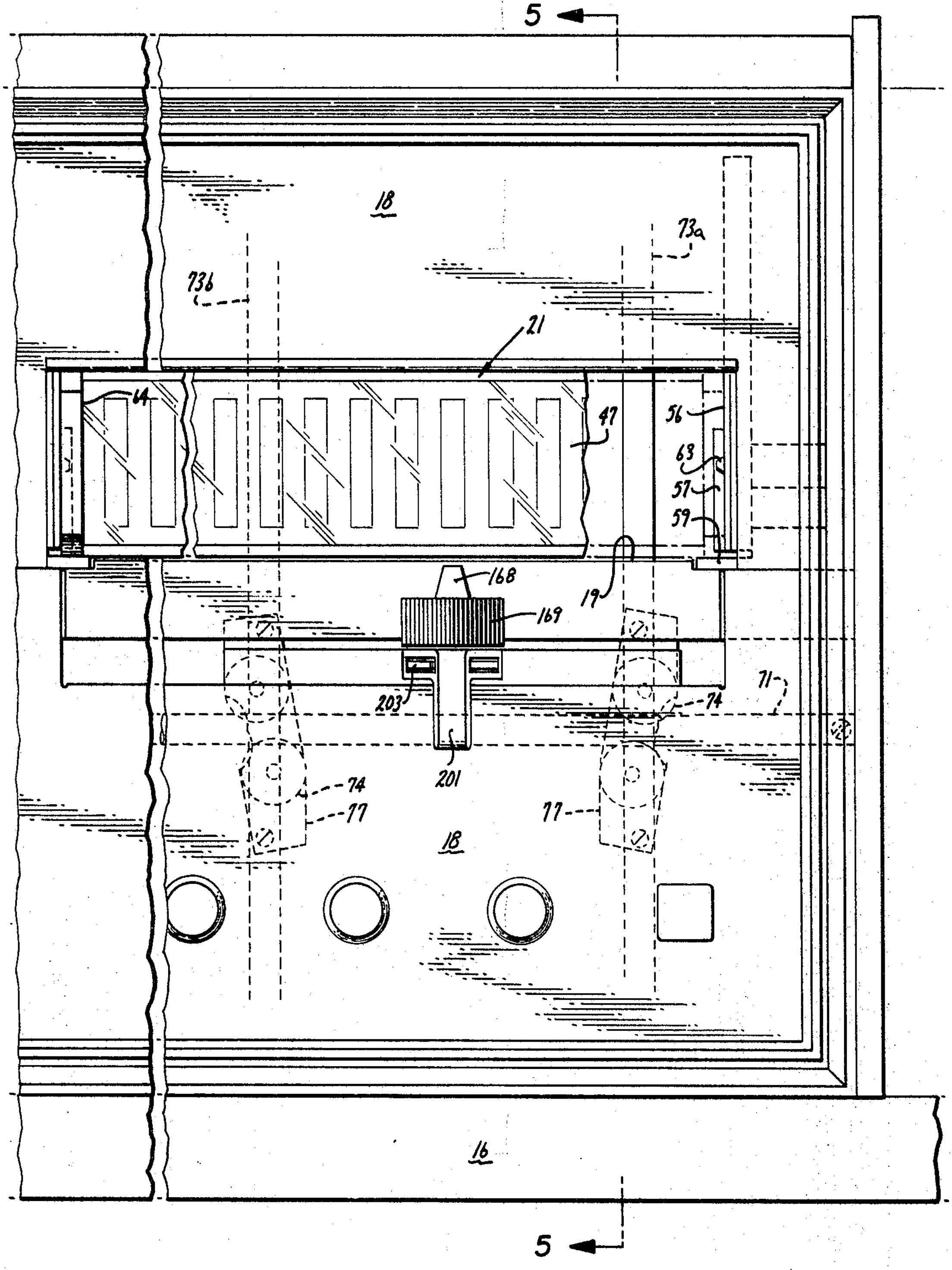
FIG. 13 is an enlarged front elevation view showing the console of the system shown in FIG. 1.
Figure 14:
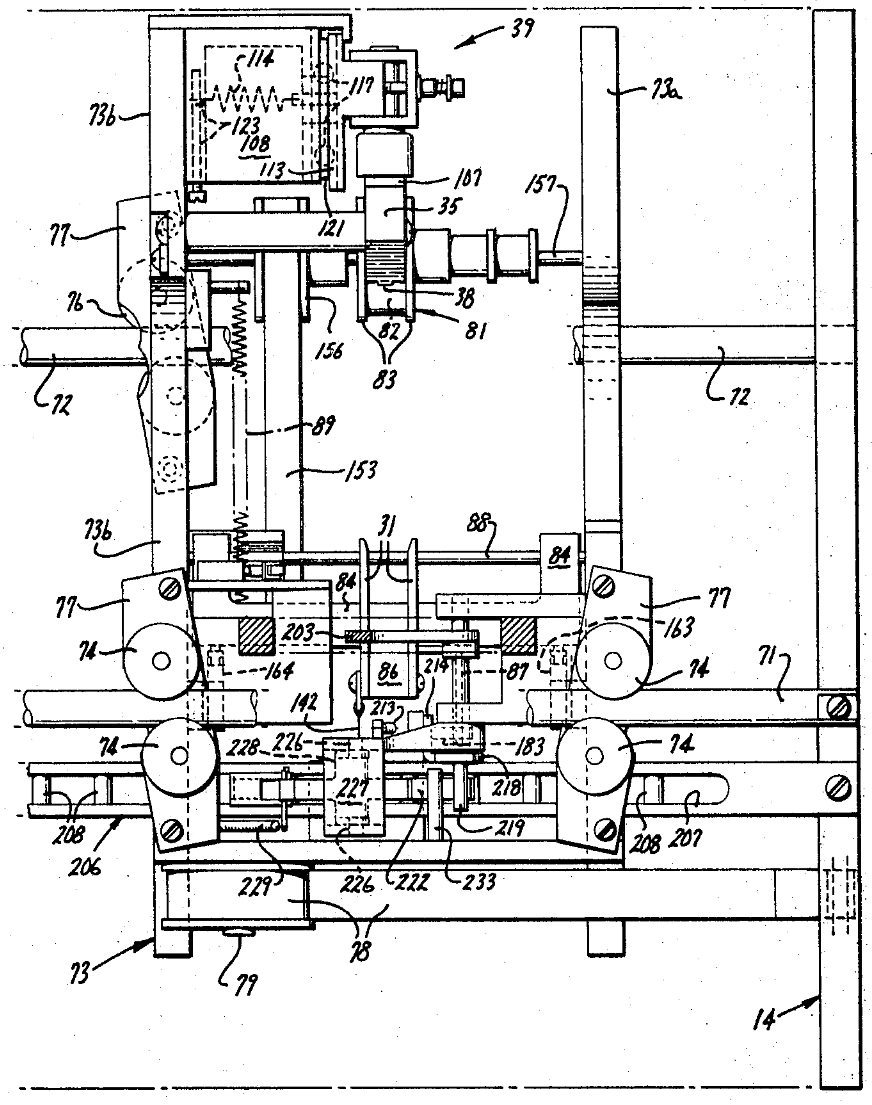
FIG. 14 is an enlarged front elevation view showing the near portions of the tape transport assembly and with the rear portions removed for purposes of preserving clarity, and provided in the same scale as FIG. 9.

Referring to FIGS. 1 and 12, means for manually positioning tape transport assembly 23 laterally along ways 71, 72 includes a handle 201 adapted to be gripped and moved along the length of front panel 18. Handle 201, thus, is connected to carriage 73. Handle 201 is further formed with groove 202 in which nests a control lever 203 for selectively releasing or engaging an escapement mechanism, now to be described.

An escapement or indexing bar track (FIG. 12) comprises a bar 206 formed with a groove 207 arranged to contain a number of detent pins 208. Each pin 208 defines one of the roll storage positions. Indexing bar 206 extends laterally beneath magazine assembly 21 and is supported at its ends to a fixed portion of the cabinet.

Control lever 203 protrudes slightly to the side of handle 201 so that it can be depressed by the thumb of a person's right hand and squeezed relative to handle 201. This action serves to release detenting means engaging one of the detent pins 208 so that tape transport assembly 23 can be manually moved to a given location corresponding to one of the indexing positions defined by pins 208.

Thus, control lever 203 is fixed to rotate the pivot pin 209 journalled in a journal block 211 attached to carriage 73.

The pivoting movement of lever 203 serves to rotate detent assembly 212 in a direction so as to release the engagement between detent assembly 212 and indexing bar 206 against the urging of spring 213 acting to retain assembly 212 engaged with bar 206.

Spring 213 normally holds detent assembly 212 in its engaged position for stepwise actuation thereof and movement of tape transport assembly 23 laterally from one roll position to the next.

As yoke 84 returns downwardly following the completion of the playing of a roll, trigger element 87 engages the pawl 183 which extends laterally of the elongated release bar 214. Release bar is mounted upon a pair of sliding pins 216 each of which is located in an associated one of a pair of elongated openings 217. Thus, bar 214 is free to move under the downward movement of trigger 87 so as to move bar 214 to the left (as shown in FIG. 12). Bar 214 further is formed to include a laterally extending flange portion 218 which carries a downwardly depending catch pin 219.

Catch pin 219 engages the projecting end 221 of a bifurcated dog 222 formed with a pair of detent teeth 223, 224.

Dog 222 is arranged to be rocked about an axis defined by the pivot pins 226 journalled within a U-shaped detent carriage 227. Thus, dog 222 is carried by attachment to a stirrup member 228.

Bar 214 is operated to move to the left by downward movement of yoke 84 during replacement of a roll of tape into magazine assembly 21. Movement of release bar 214 leftward (as shown in FIG. 12) causes catch pin 219 to rock dog 222 about the axis defined by pivot pins 226. Upward movement of yoke 84 permits spring 229 to pull tooth 223 in a direction toward engagement with one of pins 208. From the foregoing, it will be apparent that during successive reversals of the direction of movement of yoke 84, dog 222 will rock back and forth whereby teeth 223, 224 will be alternately moved into and out of engagement with detent pins 208.

Figures 16A, 16B, 16C, 16D, 16E:
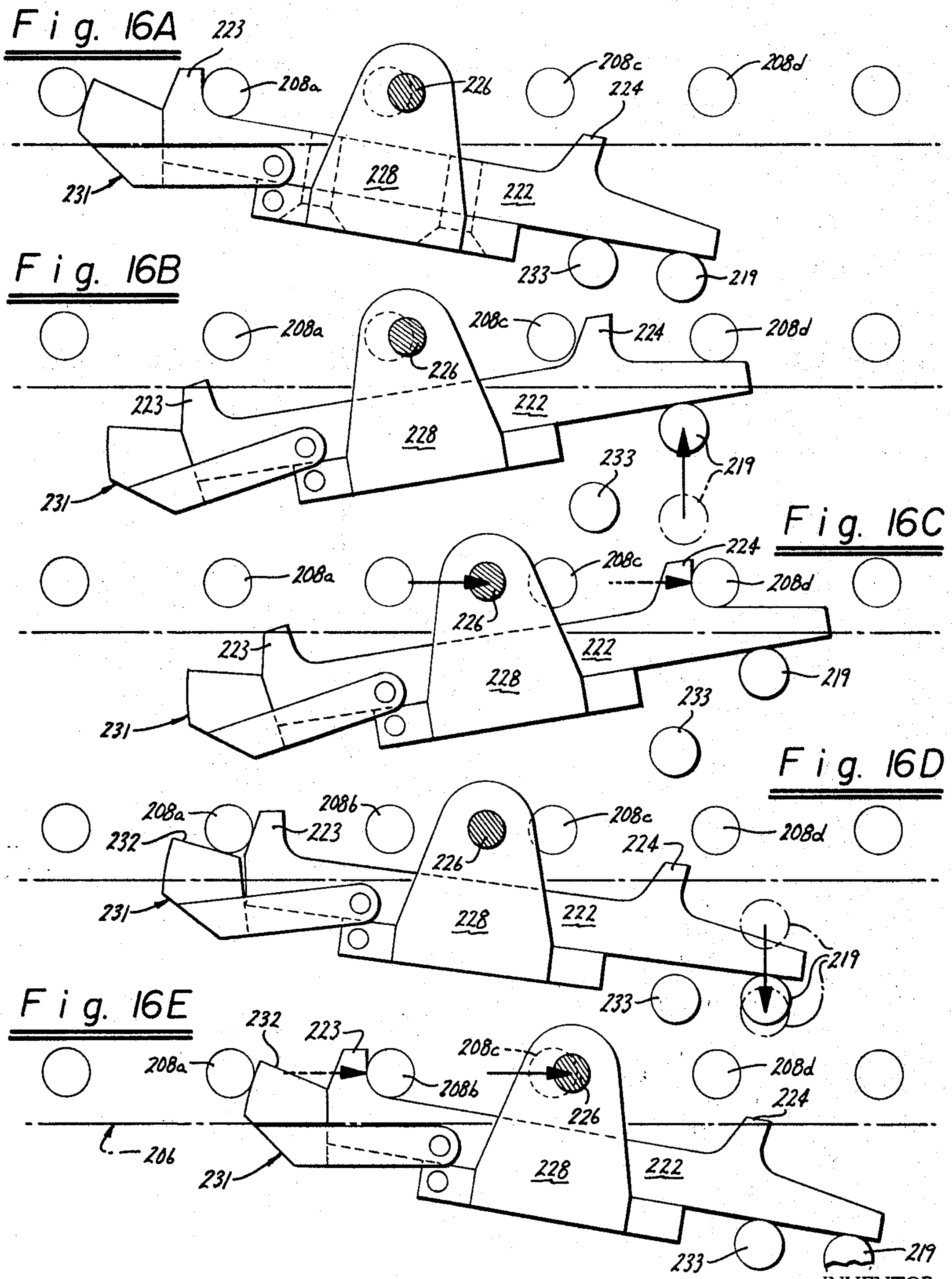
FIGS. 16A–16E diagrammatically illustrate the operation of the escapement mechanism, as shown in FIG. 12.

Referring to the diagram shown in FIG. 16, it will be apparent that in order to advance from one roll position to the next, carriage 73 will be moved in two half-steps as follows:

In a first position, tooth 223 engages pin **208*a* while tooth 224 remains withdrawn from engagement with any of pins 208 and is generally located closer to pin 208*c* than to pin 208*d***.

As bar 214 serves to rock dog 222, it will be apparent that tooth 223 disengages from pin **208*a* but not before insertion of tooth 224 between pins 208*c* and 208*d*. In this condition, dog 222 no longer engages any of the indexing pins and, accordingly, the spring 78 pulls the tape transport carriage laterally until the right hand side of tooth 224 contacts pin 208*d*. Yoke 84** at this time is, accordingly, in its lowered position.

Subsequent upward movement of yoke 84 releases bar 214 to move to the right (as shown in FIG. 12) under the urging of spring 229 and thereby to permit spring 229 also to rock dog 222. Tooth 223 is, however, at this time, aligned with the opening between pins **208*a* and 208*b*. Upon full withdrawal of tooth 224 from its engagement with pin 208*d*, the spring 78 draws the tape transport carriage until the right hand surface of tooth 223 contacts pin 208*b***.

It has been found desirable in order to reduce the possibility of tampering during the operation of the above escapement mechanism to provide an anti-chatter, resiliently loaded, wedge element 231. Wedge element 231 is pivotally mounted upon the end of dog 222 adjacent to tooth 223 and formed with a tapered surface 232 adapted to readily slide over pins 208 as assembly 212 moves along indexing bar 206 but precluding leftward movement thereof as it falls into the clearance space trailing behind tooth 223. The entire mechanism may be withdrawn, as by means of the lever 203 which withdraws carriage 227, whereby manual positioning may be achieved.

Finally, a fixed stop 233 serves to engage the right hand end 221 of dog 222 during manual movement of assembly 212 to withdraw tooth 223. Dog 222 then pivots about axis 226.

A micro-switch 164, carried by side plate **73*b* is disposed in parallel with another micro-switch 166 located in the path fo the end-of-program selector assembly 167. Assembly 167 comprises an indicator 168 to be moved by the selector knob 169 into alignment with the desired final roll of the program to be played. A groove 171 in the rear of the transverse guide bar 172 attached to panel 18, engages a pair of anti-friction guide pins 173 carried by the traveling stop block 174**.

A channel 176 in the back of block 174 accommodates a leaf spring 177, fixed at its lower end by a screw to block 174 and free at its upper end to bear upon a pressure pad in the form of a felt plug 178 extending through a hole in block 174 and into sliding engagement with the surface of bar 172.

Another felt layer 179, interposed between bar 172 and a face of selector knob 169 rubs on the other side of bar 172.

The side surface 181 of block 174 serves as a stop disposed in the path of the actuator 182 of micro-switch 166 whereby upon contact therewith, switch 166 will be conditioned to an open circuit state. By disposing switches 166 and the (similarly operating) switch 164 in parallel to control power to the system, power will be shut down only when both (a) yoke 84 is withdrawn and (b) the end of program has been reached.

The clamping pressure applied by leaf spring 177 is adjusted whereby assembly 167 can be rather freely positioned but with sufficient resistance to cause the laterally advancing movement of frame or carriage 73 to be transmitted to depress actuator 182 and thereby place switch 166 in its open circuit state.

(As referred to herein switches 163, 164, 166 are "normally closed" since they naturally tend to be in a closed circuit state.)

Micro-switch 164 is operated by the downward movement of yoke 84 whereby upon being fully moved to its retracted position, micro-switch 164 will then be opened to indicate arrival of yoke 84 at that position.

When one or the other or both of switches 166, 164 is closed, AC power will be coupled to the system. By decoupling the AC power, the system will be inactivated.

During downward movement of yoke 84 as it replaces the next to last roll 22 of a particular program, the following sequence of operations occurs.

The carriage advancing trigger 87 beneath yoke 84 operates the escapement mechanism whereby carriage 73 advances one-half step in the direction of movement toward the last roll to be played.

A fraction of a second later micro-switches 163 and 164 are operated, preferably with switch 163 being operated slightly after the operation of switch 164. Thus, the power switch 164 serves to decouple one branch of its associated circuit whereby only the closed state of switch 166 maintains power to the system. Closure of switch 163, of course, serves to advise the logic control circuitry 188 (as shown in the above referenced application S.N. 648,665) that drive motor 124 should be reversed and the head 107 switched electrically to cooperate with another of the recorded tracks along tape 27. This can be readily achieved by providing a "reset" signal to a direction control flip-flop as above described, simply by means of introducing a positive or negative voltage level onto the reset input to the direction flip-flop.

As explained above relative to the escapement mechanism, the motor must reverse in order to cause the carriage to advance the second half step toward the final roll position. Thus, only by reversing the drive of motor 124 will yoke 84 be carried again upwardly so as to cause trigger 87 to release its engagement with pawl 183.

Thus, after the operation of switch 163 has served to reverse the drive motor 124, the second half step of escapement movement occurs whereby actuator 182 of switch 166 will engage the side surface 181 of the travelling stop block 174. This action, of course, serves to place switch 166 in its open circuit state. However, switch 166 remains closed long enough whereby the upward movement of yoke 84 releases switch 164 and, via switch 164, power continues to activate the system. It will be apparent, however, that upon replacement of the last roll of the program, yoke 84 will operate switch 164 so as to de-activate the system at that time, inasmuch as switch 166 is then in its open circuit state by virtue of the contact made between actuator 182 and side surface 181.

The foregoing sequence of operations can be traced using the power circuit diagram of FIG. 17 where AC power lines 184, 186 supply power to motor 124 and also to a DC power supply 187. DC power supply 187 operates a suitable electrical logic system 188, such as that shown in the last mentioned referenced patent application. Line 184 leads to motor 124 and power supply 187, via switch 164, normally in its closed-circuit state but open at the start of operations when yoke 84 is seated.

Power supply 187 and motor 124 are further connected to be energized from lines 184, 186, via a contact point 189 (and its associated closure member) in the bypass or shunt line 190 whenever the bypass relay 191 is operated, as by means of push-button switch 192. Thus, at the start of the program, the above means serves to permit switch 164 to be bypassed in order to initiate movement of yoke 84 upwardly and thereby permit switch 164 to close.

Once push-button 192 has been depressed, a holding circuit through relay 191 may be traced from line 184 via relay point 193 (and its associated closure member), end-of-program switch 166 (presumably then closed) and relay 191 to line 186. By holding relay 191 energized, the bypass line 190 serves to energize motor 124 and power supply 187 until such time as switch 166 is opened by action of the lateral movement of frame 73 carrying transport assembly 23. Reversal of the leads 194, 196 to motor 124 is effected in response to logic system 188 as represented by the action of dashed line 197.

What is claimed is:

1. In a tape transport apparatus of the type adapted to support a length of pliable recording tape wrapped to form supply and take-up rolls, means forming a storage bin having means for individually supporting each of a plurality of tape rolls of a type where an end of the tape is disposed on the outer periphery of its associated roll, and tape transport means movable into said bin and rotatably supporting a selected one of said rolls therein during transducing of signals relative to the tape of said selected roll.

2. In a tape transport apparatus of the type adapted to support a length of pliable recording tape wrapped to form supply and take-up rolls, means forming a magazine adapted to contain a number of supply rolls of tape of a type where an end of the tape is disposed on the outer periphery of the roll, transport means, including an axially movable take-up hub, movable axially to positions adapted to be aligned with selected ones of said supply rolls and serving to rotatably support and feed the tape of a selected supply roll to and from said take-up hub while aligned therewith.

3. Tape transport apparatus according to claim 2 wherein said magazine serves to contain remaining wound portions of each of said selected rolls as said transport means engages the end of the tape and withdraws the tape from the roll for playing.

4. A tape transport apparatus of a type adapted to support a length of pliable recording tape wrapped to form supply and take-up rolls and for feeding tape from one roll to the other, said apparatus comprising means forming a storage zone adapted to contain a roll of tape resting on its edge and of the type where an end of the tape is disposed on the outer periphery thereof, said means including an opening for readily depositing the roll into and removing the roll from said zone, and a tape transport, including a take-up hub, and means movable substantially radially of the roll between retracted and advanced positions to engage and disengage said roll to selectively lift and position said roll for rotation within the zone by said transport while said transport feeds the tape from the roll onto said take-up hub.

5. A tape transport apparatus, according to claim 4, wherein said means forming the storage zone further defines an access opening thereto cooperatively disposed for entry of said movable means therethrough, and wherein said movable means moves in said access opening between said retracted and advanced positions to disengage and engage said roll respectively for rotation within said zone during transducing of signals relative to the tape of the roll.

6. In a tape transport apparatus of a type adapted to support a length of pliable recording tape wrapped to form supply and take-up rolls, a rotating drive capstan serving to support and feed said tape, a transducer for cooperating with the tape when supported by the capstan, means supporting said transducer to yieldingly move between advanced and retracted positions in continuous transducing relation with respect to the tape, means serving to support a tape roll of the type where an end of the tape is disposed on the outer periphery of the roll and including a leading portion of the tape formed with elongated surface portions, one such portion being characteristically adherent and disposed to hold the outermost convolution of the roll to the penultimate outermost convolution, and the other elongated surface portion being adjacent said adherent portion and characteristically non-adherent and thicker than said adherent portion, the thickness of said non-adherent portion being insufficient to preclude said adherent portion from being deformed into adhering engagement with the penultimate convolution of the tape roll to hold the outermost roll convolution to the penultimate outermost roll convolution, means serving to peel the leading portion of the tape from the roll and release the grip of the outermost convolution of tape from the penultimate outermost convolution of tape and to feed said leading portion between said capstan and said transducer, the thickness of said non-adherent portion being sufficiently thick when fed between said transducer and said capstan to yieldingly wedge said transducer away from said capstan sufficiently to cause said adherent portion to pass clear of said transducer while in confronting relation thereto.

7. For use with a tape transport apparatus of a type adapted to support a length of pliable recording tape wrapped to form supply and take-up rolls and to feed the tape from the supply to the take-up roll, a roll of recording tape comprising a cylindrical hub adapted to be supported for rotation, a length of pliable recording tape wrapped about said hub to form convolutions therearound, the outer end portion of said tape being characterized by a leader portion, said leader portion including elongated portions extending along the leader portion in confronting relation to the penultimate outermost convolution of tape on the roll, one of said elongated portions being adherent so as to hold the leader portion to the penultimate outermost convolution of tape on the roll while another of said elongated portions is characterized by a non-adherent surface to remain unadhered to said penultimate outermost convolution, the last named elongate portion being thicker than the thickness of the first named elongated portion so as to be adapted to urge a cooperating transducer to a position spaced from the surface of said adherent portion and thereby serve to protect the transducer from contact with said adherent portion.

8. For use with a tape transport apparatus of a type adapted to support a length of pliable recording tape wrapped to form supply and take-up rolls and to feed the tape from the supply roll to the take-up roll, a roll of recording tape comprising a cylindrical hub of solid, imperforate construction at the axis of rotation thereof and including side face portions on opposite sides thereof, a length of recording tape wrapped around said hub to form successive convolutions, the opposite edges of said tape convolutions lying substantially in planes flush with the side face portions of the hub, a coaxial shoulder portion formed to extend axially outwardly of each side face portion thereof and further including a support protuberance axially of said hub adapted to form a supporting axle for said roll and adapted to be engaged and supported for rotation by laterally spaced elements, said coaxial shoulder portions serving to preserve a predetermined clearance between said spaced elements and the respective edges of said tape convolutions, and means for repeatedly releasably adhering the outermost convolution of tape to the penultimate outermost convolution.

9. For use with a tape transport apparatus of a type adapted to support a length of pliable recording tape wrapped to form supply and take-up rolls and to feed the tape from the supply to the take-up roll, a roll of recording tape comprising a cylindrical hub adapted to be supported for rotation, a length of pliable recording tape wrapped about said hub to form convolutions therearound, the outer end portion of said tape being characterized by a leader portion, said leader portion defining the outer convolution of the roll and having margins releasably adhering to the penultimate outermost convolution, a longitudinally extending portion disposed intermediate said margins forming a non-adherent surface adapted to be engaged by a wedging element interposed between the outermost and penultimate outermost convolutions to disengage the grip of said outermost convolution upon the penultimate outermost convolution.

10. A roll of tape recording to claim 9 wherein said intermediate portion of the tape is thicker than said marginal portions so as to be adapted to urge a transducer to a position spaced from the surface of said adherent margins and thereby serve to protect the transducer from contact with said adherent margins.

11. In a tape transport apparatus of a type for feeding a length of pliable recording tape wrapped to form supply and take-up rolls, means forming arcuate rotating surface portions adapted to support the tape and feed same from a supply roll, means serving to rotatably support the supply roll for resilient engagement with said arcuate surface portions, a rotatable take-up hub, means serving to pivotally support the axis of rotation of said hub for arcuate movement between advanced and retracted positions to move said hub in yielding engagement with said arcuate rotating surface portions, the last named means including an axle radially remote from said axis and movable with movement of the axis of said hub in an arc struck from the axle, and a clamp including jaw portions frictionally engaging said axle to apply resistance to the arcuate movements of the axis of said hub to increase the resistance of said yielding engagement to relatively exceed the force of said resilient engagement when feeding tape to said take-up hub, and to diminish the force of said yielding engagement below said resilient engagement when feeding tape from said take-up hub to said supply roll.

12. In a tape transport apparatus of the type adapted to support a length of pliable recording tape wrapped to form supply and take-up rolls, means forming a magazine adapted to contain a number of supply rolls of tape of a type where an end of the tape is disposed on the outer periphery of the roll, transport means including a take-up hub, cooperating with selected ones of said supply rolls and serving to engage and feed the tape of a selected supply roll to and from said take-up hub, said transport means further including means for entering said magazine to engage and support said selected ones of said supply rolls for rotation in said magazine during feeding of the length of tape to said take-up hub.

13. In a tape transport of a type wherein a length of pliable recording tape, wrapped to form supply and take-up rolls, is fed from the supply to the take-up roll, a tape drive system comprising a rotating capstan supporting the tape and adapted to dispose the supported tape in cooperative relation to a transducer, a drive motor, a flywheel of relatively great mass, an elastic cyclic belt coupled between said motor and the flywheel, and a relatively inelastic belt coupled between said flywheel and said capstan to rotate said capstan, and means mounting said flywheel for movement to tension said inelastic belt.

References Cited

UNITED STATES PATENTS

| | | | |
|---|---|---|---|
| 2,345,869 | 4/1944 | Edwards. | |
| 2,964,593 | 12/1960 | Kleve. | |
| 3,034,739 | 5/1962 | Barger | 242—68.4 |
| 3,081,668 | 3/1963 | Nistri | 252—123 |
| 3,134,550 | 5/1964 | Camras | 242—55.13 |
| 3,199,802 | 8/1965 | Polley et al. | |
| 3,217,996 | 11/1965 | Bernier | 274—41.4 X |
| 3,305,186 | 2/1967 | Burdorf et al. | 242—55.12 |
| 3,370,803 | 2/1968 | Newell | 242—55.12 |
| 3,370,804 | 2/1968 | Peyton | 242—55.14 X |

GEORGE F. MAUTZ, Primary Examiner

U.S. Cl. X.R.

242—68.4, 74, 180, 186, 192, 195, 197; 274—41.4